US010074146B2

(12) United States Patent
Selsby

(10) Patent No.: US 10,074,146 B2
(45) Date of Patent: Sep. 11, 2018

(54) BUYER DRIVEN MARKET SYSTEM AND METHOD

(76) Inventor: Adam Selsby, Chicago, IL (US)

( * ) Notice: Subject to any disclaimer, the term of this patent is extended or adjusted under 35 U.S.C. 154(b) by 1431 days.

(21) Appl. No.: 12/869,716

(22) Filed: Aug. 26, 2010

(65) Prior Publication Data

US 2012/0054108 A1  Mar. 1, 2012

(51) Int. Cl.
*G06Q 30/06* (2012.01)
*G06Q 50/18* (2012.01)

(52) U.S. Cl.
CPC ........... *G06Q 50/188* (2013.01); *G06Q 30/06* (2013.01); *G06Q 30/0601* (2013.01); *G06Q 30/0611* (2013.01); *G06Q 30/0613* (2013.01); *G06Q 30/0641* (2013.01)

(58) Field of Classification Search
USPC .......................................... 705/26.1, 1.1, 80
See application file for complete search history.

(56) References Cited

U.S. PATENT DOCUMENTS

| | | | |
|---|---|---|---|
| 7,577,582 B1 * | 8/2009 | Ojha et al. | 705/26.3 |
| 2003/0182413 A1 * | 9/2003 | Allen et al. | 709/223 |
| 2009/0271317 A1 * | 10/2009 | Walker et al. | 705/51 |

OTHER PUBLICATIONS

NexTag, Dec. 16, 2008, www.nextag.com.*

* cited by examiner

*Primary Examiner* — Jan P Mincarelli
(74) *Attorney, Agent, or Firm* — Excellere IP Internationl; Anne K. Burkhart

(57) ABSTRACT

An electronic negotiation system is set forth. The system includes a first processor adapted to generate and send at least one unsolicited electronic offer from a registered buyer electronic device via a subscriber network device to at least one of a registered seller electronic device and a seller electronic device. The subscriber network device is adapted for operative communication with the first processor and at least one of the registered seller electronic device and the seller electronic device adapted to receive the unsolicited electronic offer. The first processor selectively incorporates screenshot information from a seller URL, which includes any data from the seller URL, in which the unsolicited electronic offer is selectively incorporated and sent to the seller electronic device, or the at least one unsolicited electronic offer is sent to the registered seller electronic device having registered user data stored in the data storage device.

4 Claims, 29 Drawing Sheets

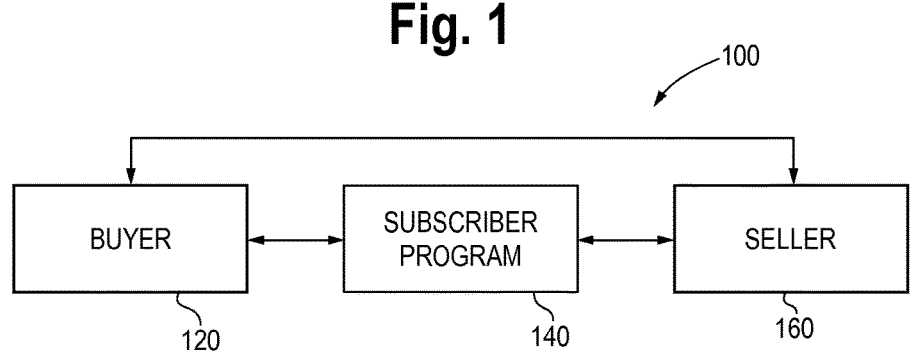
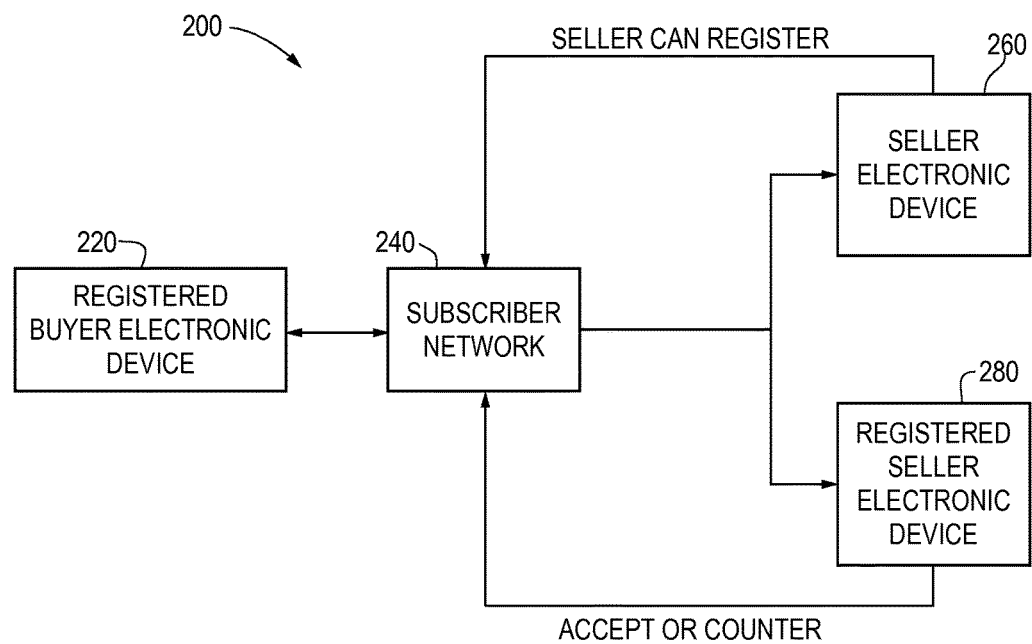

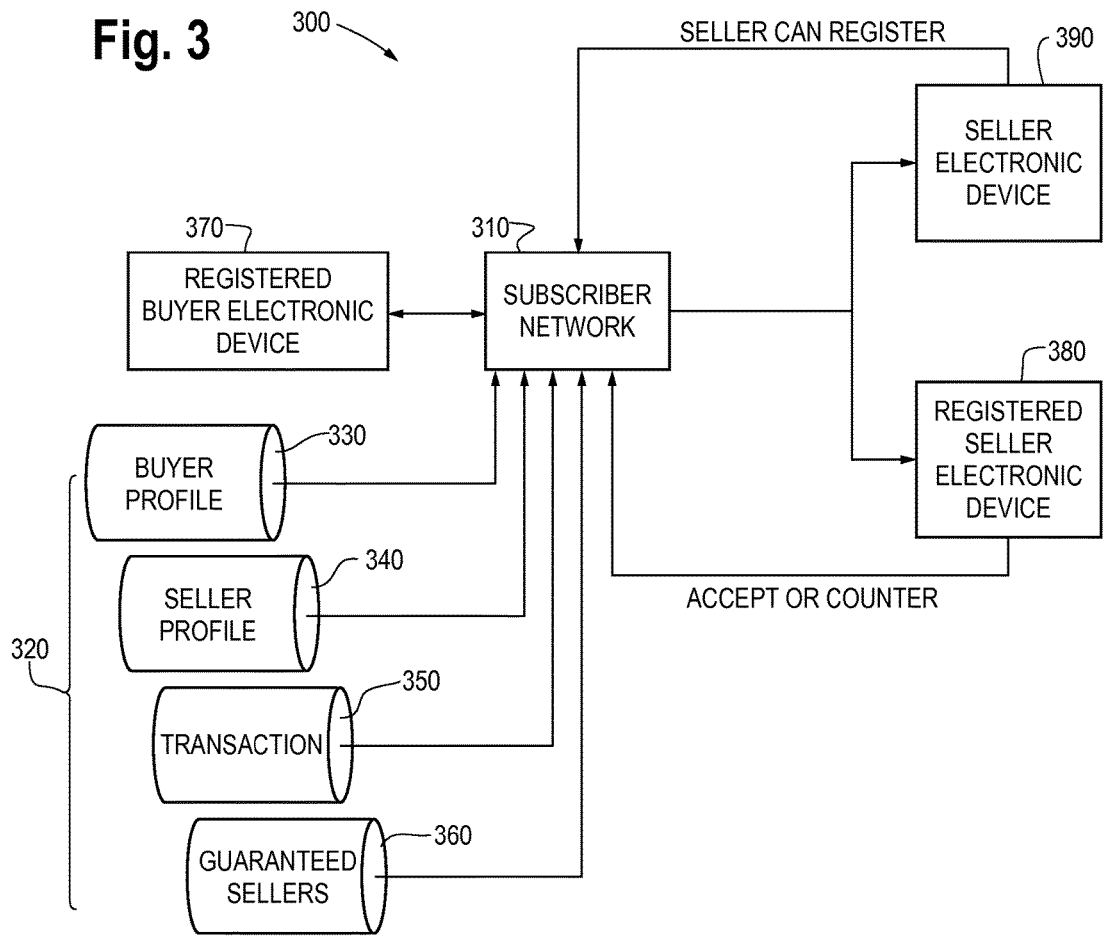
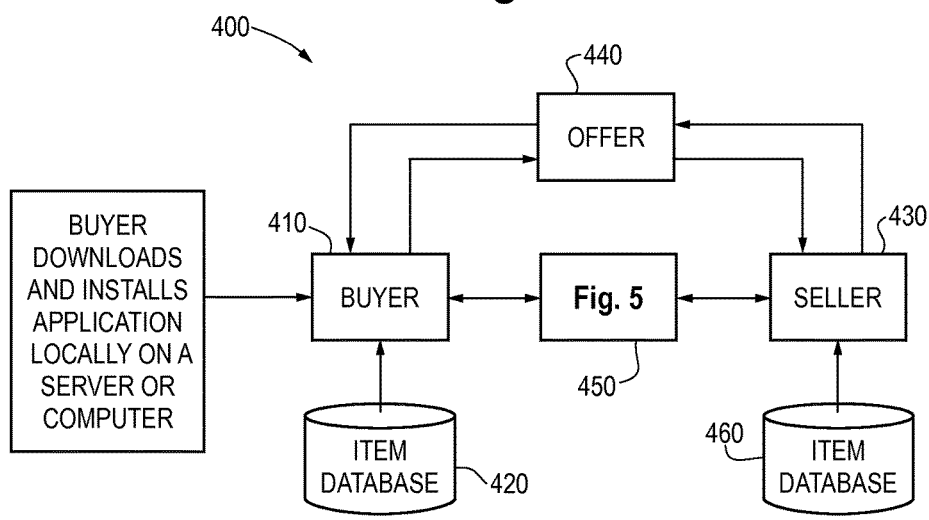

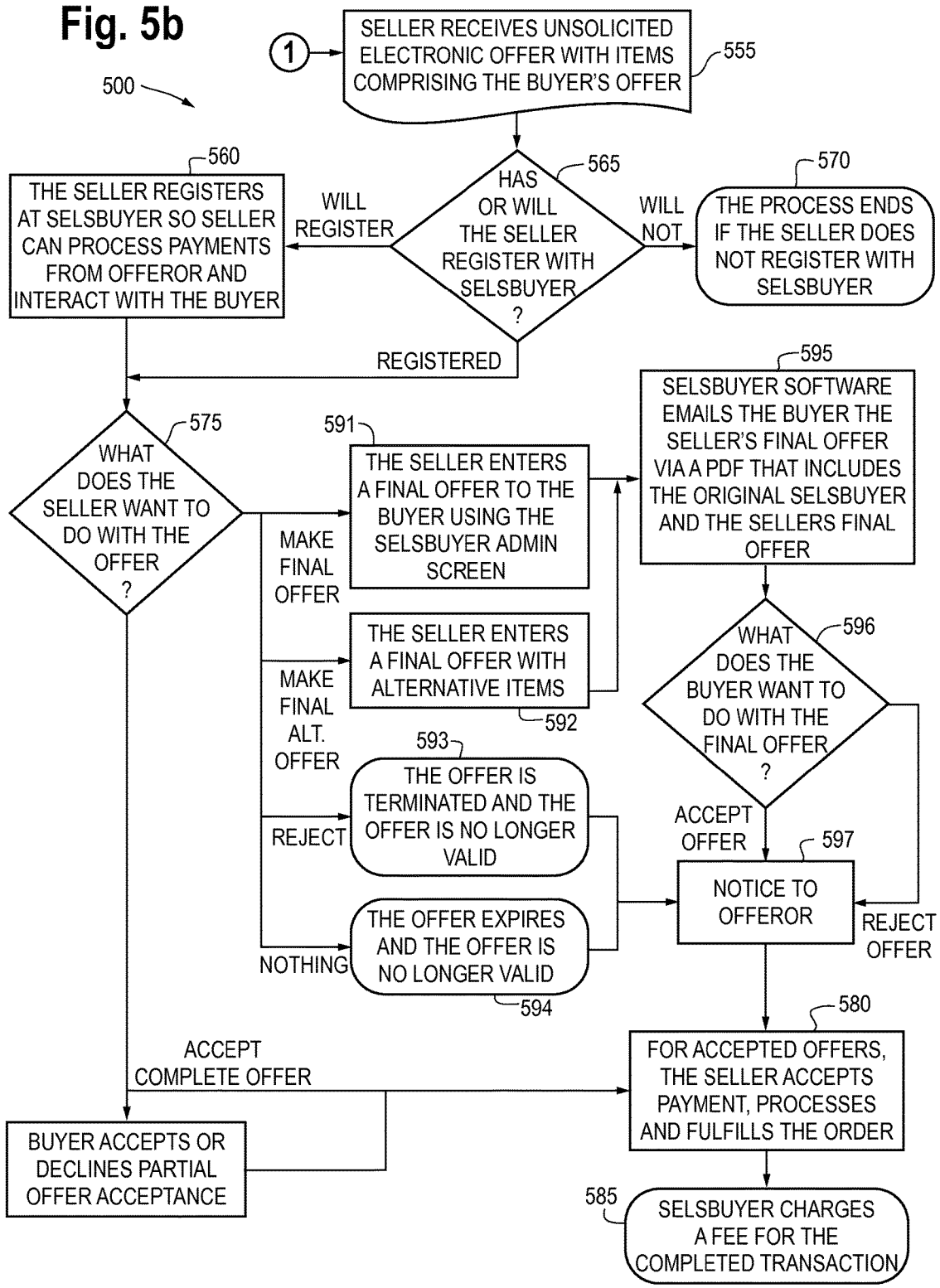

Fig. 7

| Transaction Date | Buyer | Buyer Star Ranking | ID | Original Price | Counter Offer | Final Offer | Amount Received | Savings | Status | Expiration | Action | Receipt |
|---|---|---|---|---|---|---|---|---|---|---|---|---|
| 10-Nov-08 | Adam Selsby | 4 | 87563322 | $165.00 | $145.00 | $155.00 | $155.00 | $10.00 | Final Offer Made | 12-Nov-08 | | PDF Here |
| 9-Oct-08 | Adam Selsby | 4 | 29343423 | $200.00 | $180.00 | N/A | $180.00 | $20.00 | Completed | | | PDF Here |
| 29-Aug-08 | Adam Selsby | 4 | 83546532 | $500.00 | $200.00 | N/A | | N/A | Rejected | | | PDF Here |
| 19-Aug-08 | Adam Selsby | 4 | 12435234 | $500.00 | $200.00 | $400.00 | $400.00 | $100.00 | Completed | | | PDF Here |
| 27-Jul-08 | Adam Selsby | 4 | 74253452 | $324.00 | $150.00 | N/A | | N/A | Rejected | | | PDF Here |
| 18-Jul-08 | Adam Selsby | 4 | 32142134 | $90.00 | $75.00 | N/A | $75.00 | $15.00 | Completed | | | PDF Here |
| 9-Jun-08 | Adam Selsby | 4 | 45412524 | $200.00 | $175.00 | N/A | $175.00 | $25.00 | Completed | | | PDF Here |
| 29-Aug-08 | John Prince | 4 | 83546532 | $500.00 | $200.00 | N/A | | N/A | Rejected | | | PDF Here |
| 19-Aug-08 | Josh Selsby | 4 | 12435234 | $500.00 | $300.00 | $400.00 | $400.00 | $100.00 | Completed | | | PDF Here |
| 9-Nov-08 | Nancy Prince | 4 | 74253452 | $324.00 | | | | | | 12-Nov-08 | Accept Make Final Offer Reject | PDF Here |
| 18-Jul-08 | Nancy Prince | 4 | 32142134 | $90.00 | $75.00 | N/A | $75.00 | $15.00 | Completed | | | PDF Here |
| 9-Jun-08 | Nancy Prince | 4 | 45412524 | $200.00 | $175.00 | N/A | $175.00 | $25.00 | Completed | | | PDF Here |

700

710 — The Seller can click on "Accept" to bring up the Process Payment screen, which is a pipe directly to the seller's payment gateway or PayPal or Google Checkout.

720 — The Seller can "Make Final Offer" and it will bring up the screen where the Seller enters the dollar value for the Final Offer.

730 — The Seller can click "Reject" to terminate the transaction

Reports
History by Buyer
History by Time Period
Counter Offer Matrix
Final Offer Matrix
Report Problem User

| Shopping | Services | Hotel | Rental Car | Flight | | | |
|---|---|---|---|---|---|---|---|
| Item Name | Manufacturer | Model # | Item Link | Quantity | Offer Price / Unit | | Total Item Offer |
| Sneaky Shorts | Dr. Sneaky | DR1001 | http://www.drs | 2 | $ | 15.00 | $ 30.00 |
| Sony Cybershot HX1 | Sony | HX1 | http://www.dig | 1 | $ | 405.00 | $ 405.00 |
| | | | | | | | $ . |
| | | | | | | | $ . |
| | | | | | | | $ . |
| | | | | | | | $ . |
| | | | | | | | $ . |
| | | | | | | | $ . |
| | | | | | | | $ . |
| | | | | Total Offer | | | $ 435.00 |

Seller URLs:
www.drsneaky.com
www.tailgatecentral.com

Submit

Fig. 11c

Counter Offer with unregistered seller

Welcome to Dr. Sneaky: Home of Everything Awesome

| Item Name/Item # | Quantity | Price/ea. | Extended |
|---|---|---|---|
| Sneaky Shorts | 3 | $19.99 | $59.97 |
| | 1 | $49.99 | $49.99 |
| | 1 | $28.00 | $28.00 |
| | 1 | $32.00 | $32.00 |

Sub Total: 169.96
Order Total: $169.96
Total Items: 4

WWW.SELSBY.COM
COUNTER OFFER

- Seller Site:
- Seller Profile: New Seller — www.drsneaky.com
- Seller eMail: info@drsneaky.com
- Time: 11/10/08 12:00PM
- Buyer: Adam Selsby
- Ship To: 4004 N. Clarendon, #2 Chicago, IL 60613
- Edit
- Original Price: $ 169.96
- Counter Offer: $ 145.00
- Offer Expiration: 12:00 AM  Wednesday, November 12, 2008
- Payment Type: PayPal
- Shipping Method: UPS, FedEx or DHL Ground
- Notes:

Confirm

Manually operated Kooler Klub
Pours like a keg, looks like a club
The must have for golfers who 1120
1130

Fig. 11d

Counter Offer with registered seller

COUNTER OFFER
FROM BUYER: Adam Selsby

THE FOLLOWING OFFER HAS BEEN MADE BY THE BUYER IDENTIFIED, FOR THE TOTAL VALUE OF THE ITEMS IDENTIFIED ABOVE, INCLUDING ANY AND ALL TAXES AND SHIPPING AND HANDLING CHARGES. YOU MUST RESPOND TO THE BUYERS'S OFFER BEFORE THE EXPIRATION DATE OR IT WILL BE NULL AND VOID. USE THE LINKS BELOW TO RESPOND

WWW.SELSBY.COM
COUNTER OFFER

| | | |
|---|---|---|
| Transation ID: 87563322 | Date | Wednesday, November 12, 2008 |
| Seller Website: | | www.drsneaky.com |
| Buyer: | Adam Selsby | |
| | Original Price: $ | ~~169.96~~ |
| | Counter Offer: $ | 145.00 |
| Discount of Offer | | 14.7% |
| Offer Expiration: | 12:00 AM | Wednesday, November 12, 2008 |
| Payment Type: | PayPal | |
| Shipping Method: | UPS, FedEx or DHL Ground | |
| Notes: | | |
| Total $ Purchased From Your Store | $ | 385.00 |
| Total Number of Completed Transactions With Seller | | 4 |
| Total Number of Counter Offers Made To Seller: | | 5 |
| Total Number of Counter Offers Accepted By Seller: | | 1 |
| Total Number of Final Offers Made By Seller: | | 3 |
| Total Number of Final Offers Accepted By Seller: | | 3 |
| Most Recent Transaction: | | October 6, 2008  Detail |
| Buyer Profile: | ★ ★ ★ ★ | |
| Buyer eMail: | aselsby@yahoo.co.uk | |
| Ship To: | 4004 N. Clarendon, #2 Chicago, IL 60613 | |

Make Final Offer — Submit a final counter offer to the buyer that may only be accepted or rejected by the Buyer

Accept Offer — Accept this counter offer and proceed to accept payment and process order.

Reject Offer — Reject this counter offer and terminate this potential transaction.

Registration of SelsBy - Seller - Admin

Website: www.drsneaky.com
Admin eMail: adam.selsby @drsneaky.com

[Sign-In]

New Customer
Complete the form below if you are a new customer.

Email Address:
New Password:
Confirm New Password:

Billing Address:
Name:
Phone:
Street Address:
City:
State/Province: Alabama
Zip/Postal Code:
Country: United States

[Continue]

Shipping Address
Name:
Phone:
Street Address:
City:
State/Province: Alabama
Zip/Postal Code:
Country: United States

[Continue]

Credit Card Payment Gateway Info:
PayPal Detail:
Google Checkout Detail

Setup Users

| Transaction Date | Buyer | Buyer Star Ranking | ID | Original Price | Counter Offer | Final Offer | Amount Received | Savings | Status | Expiration | Action | Receipt |
|---|---|---|---|---|---|---|---|---|---|---|---|---|
| 10-Nov-08 | Adam Selsby | 4 | 87563322 | $165.00 | $145.00 | $155.00 | $155.00 | $10.00 | Final Offer Made | 12-Nov-08 | | PDF Here |
| 9-Oct-08 | Adam Selsby | 4 | 29343423 | $200.00 | $180.00 | N/A | $180.00 | $20.00 | Completed | | | PDF Here |
| 29-Aug-08 | Adam Selsby | 4 | 83546532 | $500.00 | $200.00 | N/A | | N/A | Rejected | | | PDF Here |
| 19-Aug-08 | Adam Selsby | 4 | 12435234 | $500.00 | $200.00 | $400.00 | $400.00 | $100.00 | Completed | | | PDF Here |
| 27-Jul-08 | Adam Selsby | 4 | 74253452 | $324.00 | $150.00 | N/A | | N/A | Rejected | | | PDF Here |
| 18-Jul-08 | Adam Selsby | 4 | 32142134 | $90.00 | $75.00 | N/A | $75.00 | $15.00 | Completed | | | PDF Here |
| 9-Jun-08 | Adam Selsby | 4 | 45412524 | $200.00 | $175.00 | N/A | $175.00 | $25.00 | Completed | | | PDF Here |
| 29-Aug-08 | John Prince | 4 | 83546532 | $500.00 | $200.00 | N/A | | N/A | Rejected | | | PDF Here |
| 19-Aug-08 | Josh Selsby | 4 | 12435234 | $500.00 | $200.00 | $400.00 | $400.00 | $100.00 | Completed | | | PDF Here |
| 9-Nov-08 | Nancy Prince | 4 | 74253452 | $324.00 | $300.00 | $400.00 | | | | 22-Nov-08 | Accept Make Final Offer Reject | PDF Here |
| 18-Jul-08 | Nancy Prince | 4 | 32142134 | $90.00 | $75.00 | N/A | $75.00 | $15.00 | Completed | | | PDF Here |
| 9-Jun-08 | Nancy Prince | 4 | 45412524 | $200.00 | $175.00 | N/A | $175.00 | $25.00 | Completed | | | PDF Here |

1194

Total Completed Transactions
Total Original Price       $ 1,155.00
Total Received             $   985.00
Total Discount $           $   170.00
Total Discount %               14.7%

Reports
History by Buyer
History by Time Period
Counter Offer Matrix
Final Offer Matrix
Report Annoying User The Seller can click on "Accept" to bring up the Process Payment screen, which is a pipe directly to the seller's payment gateway or PayPal or Google Checkout.

The Seller can "Make Final Offer" and it will bring up the screen where the Seller enters the dollar value for the Final Offer The Seller can click "Reject" to terminate the transaction

| Transaction Date | Buyer | Buyer Star Ranking | ID | Original Price | Counter Offer | Final Offer | Amount Received | Savings | Status | Expiration | Action | Receipt |
|---|---|---|---|---|---|---|---|---|---|---|---|---|
| 10-Nov-08 | Adam Selsby | 4 | 87563322 | $165.00 | $145.00 | $155.00 | $155.00 | $10.00 | Final Offer Made | 12-Nov-08 | | PDF Here |
| 9-Oct-08 | Adam Selsby | 4 | 29343423 | $200.00 | $180.00 | N/A | $180.00 | $20.00 | Completed | | | PDF Here |
| 29-Aug-08 | Adam Selsby | 4 | 83546532 | $500.00 | $200.00 | N/A | N/A | N/A | Rejected | | | PDF Here |
| 19-Aug-08 | Adam Selsby | 4 | 12435234 | $500.00 | $200.00 | $400.00 | $400.00 | $100.00 | Completed | | | PDF Here |
| 27-Jul-08 | Adam Selsby | 4 | 74253452 | $324.00 | $150.00 | N/A | N/A | N/A | Rejected | | | PDF Here |
| 18-Jul-08 | Adam Selsby | 4 | 32142134 | $90.00 | $75.00 | N/A | $75.00 | $15.00 | Completed | | | PDF Here |
| 9-Jun-08 | Adam Selsby | 4 | | | | | | | | | | |
| 29-Aug-08 | John Prince | 4 | | | | | | | | | Accept Make Final Offer Reject | PDF Here |
| 19-Aug-08 | Josh Selsby | 4 | | | | | | | | | | |
| 9-Nov-08 | Nancy Prince | 4 | | | | | | | | | | PDF Here |
| 18-Jul-08 | Nancy Prince | 4 | | | | | | | | | | |
| 9-Jun-08 | Nancy Prince | 4 | | | | | | | | | | |

Total Completed Transactions
Total Original Price
Total Received
Total Discount $
Total Discount %

Reports
History by Buyer
History by Time Period
Counter Offer Matrix
Final Offer Matrix
Report Annoying User

---

WWW.SELSBY.COM
FINAL OFFER

Transaction ID: 87563322    Date:    Tuesday, November 12, 2008
Seller Website:    www.drsneaky.com
Buyer:    Adam Selsby Original Price:    $ ~~169.96~~
Counter Offer:    $ ~~145.00~~
Final Offer:    $ 155.00

Discount of Final Offer:    8.8%
Final Offer Expiration:    12:00 AM    Friday, November 14, 2008
Payment Type:    PayPal
Shipping Method:    UPS, FedEx or DHL Ground
Notes:

[Confirm Final Offer]

Fig. 11n

| Transaction Date | Buyer | Buyer Star Ranking | ID | Original Price | Counter Offer | Final Offer | Amount Received | Savings | Status | Expiration | Action | Receipt |
|---|---|---|---|---|---|---|---|---|---|---|---|---|
| 10-Nov-08 | Adam Selsby | 4 | 87563322 | $165.00 | $145.00 | $155.00 | $155.00 | $10.00 | Final Offer Made | 12-Nov-08 | | PDF Here |
| 9-Oct-08 | Adam Selsby | 4 | 29343423 | $200.00 | $180.00 | N/A | $180.00 | $20.00 | Completed | | | PDF Here |
| 29-Aug-08 | Adam Selsby | 4 | 83546532 | $500.00 | $200.00 | N/A | N/A | N/A | Rejected | | | PDF Here |
| 19-Aug-08 | Adam Selsby | 4 | 12435234 | $500.00 | $200.00 | $400.00 | $400.00 | $100.00 | Completed | | | PDF Here |
| 27-Jul-08 | Adam Selsby | 4 | | | | | | | | | | PDF Here |
| 18-Jul-08 | Adam Selsby | 4 | | | | | | | | | | PDF Here |
| 9-Jun-08 | Adam Selsby | 4 | | | | | | | | | Accept Make Final Offer Reject | PDF Here |
| 29-Aug-08 | John Prince | 4 | | | | | | | | | | PDF Here |
| 19-Aug-08 | Josh Selsby | 4 | | | | | | | | | | PDF Here |
| 9-Nov-08 | Nancy Prince | 4 | | | | | | | | | | PDF Here |
| 18-Jul-08 | Nancy Prince | 4 | | | | | | | | | | |
| 9-Jun-08 | Nancy Prince | 4 | | | | | | | | | | |

Total Completed Transactions
Total Original Price
Total Received
Total Discount $
Total Discount %

Reports
History by Buyer
History by Time Period
Counter Offer Matrix
Final Offer Matrix
Report Annoying User

---

WWW.SELSBY.COM
FINAL OFFER

Transaction ID: 87563322
Seller Website: www.drsneaky.com
Buyer: Adam Selsby  Date: Tuesday, November 12, 2008

Original Price: $ ~~169.96~~
Counter Offer: $ ~~145.00~~
Final Offer: $ 155.00

Discount of Final Offer: 8.8%
Final Offer Expiration: 12:00 AM  Friday, November 14, 2008
Payment Type: PayPal
Shipping Method: UPS, FedEx or DHL Ground
Notes:

Submit Final Offer

You have received a Final Offer - Trans ID: 875633322
Adam Selsby <adam.selsby@tradingpartners.com>
Standard Header ▼
Saturday, October 18, 2008 2:47:12 PM
To: aselsby@yahoo.co.uk
📎 Final Offer Page 1 to Buyer.pdf (699KB)

Dear Adam,

You have received a Final Offer of $155.00 from www.drsneaky.com. As the Buyer, you may Accept, or Reject this Final Offer. The items in your offer have not changed from your original Counter Offer. As a reminder, you may see the original items and Offer History on the attached PDF receipt of the transaction.

This Final Offer expires: November 12, 2008 at 12:00AM ET.

If you wish to Accept this Final Offer, your response must be received before the Final Offer expires*.

To respond, please use the links embedded at the end of the receipt or use the links below.

Accept- Go to Selsby.com to process payment and complete transaction
Reject - Terminate this transaction To learn more about SelsBy, please visit http://www.SelsBy.com

*If there is no response prior to the Offer Expiration Date, the transaction will be ended automatically.

Fig. 11p

| | |
|---|---|
| Total $ Purchased From Your Store | $ 385.00 |
| Total Number of Completed Transactions With Seller | 4 |
| Total Number of Counter Offers Made To Seller: | 5 |
| Total Number of Counter Offers Accepted By Seller: | 1 |
| Total Number of Final Offers Made By Seller: | 3 |
| Total Number of Final Offers Accepted By Seller: | 3 |
| Most Recent Transaction: | October 6, 2008  Detail |
| Buyer Profile: | ★★★★ |
| Buyer eMail: | aselsby@yahoo.co.uk |
| Ship To: | 4004 N. Clarendon, #2 Chicago, IL 60613 |

FINAL OFFER
FROM SELLER: www.drsneaky.com

Fig. 11q

THE ABOVE SELLER HAS REJECTED YOUR COUNTER OFFER ABOVE AND HAS MADE THE FOLLOWING FINAL OFFER TO THE IDENTIFIED BUYER ABOVE, FOR THE TOTAL VALUE OF THE ITEMS IDENTIFIED ABOVE, INCLUDING ANY AND ALL TAXES AND SHIPPING AND HANDLING CHARGES. YOU MUST RESPOND TO THE SELLER'S FINAL OFFER BEFORE THE EXPIRATION DATE OR IT WILL BE NULL AND VOID. USE THE LINKS BELOW TO RESPOND.

WWW.SELSBY.COM
FINAL OFFER

Transaction ID: 87563322
Seller Website:     Date    Wednesday, November 12, 2008
    www.drsneaky.com
Buyer: Adam Selsby Original Price: $ ~~169.96~~
    Counter Offer: $ ~~145.00~~
    Final Offer: $ 155.00

Discount of Final Offer     8.8%
Final Offer Expiration: 12:00 AM      Friday, November 14, 2008
Payment Type: PayPal
Shipping Method: UPS, FedEx or DHL Ground
Notes:

Total $ Purchased From Your Store      $ 385.00
Total Number of Completed Transactions With Seller      4
Total Number of Counter Offers Made To Seller:      6
Total Number of Counter Offers Accepted By Seller:      1
Total Number of Final Offers Made By Seller:      4
Total Number of Final Offers Accepted By Seller:      3
Most Recent Completed Transaction:      October 6, 2008
Seller Profile: ★ ★ ★ ★      Detail
Seller eMail: info@drsneaky.com

Accept Offer      Accept this counter offer and proceed to accept payment and process order.

Reject Offer      Reject this counter offer and terminate this potential transaction.

| Transaction Date | Seller | Buyer Star Ranking | ID | Original Price | Counter Offer | Final Offer | Amount Received | Savings | Status | Expiration | Action | Receipt |
|---|---|---|---|---|---|---|---|---|---|---|---|---|
| 10-Nov-08 | www.drsneaky.com | 4 | 87563322 | $ 165.00 | $ 145.00 | $ 155.00 | $ 155.00 | $ 10.00 | Action Required | 12-Nov-08 | Accept \| Reject | PDF Here |
| 9-Oct-08 | www.drsneaky.com | 4 | 29343423 | $ 200.00 | $ 180.00 | N/A | $ 180.00 | $ 20.00 | Completed | | | PDF Here |
| 29-Aug-08 | www.drsneaky.com | 4 | 83546532 | $ 500.00 | $ 200.00 | N/A | | N/A | Rejected | | | PDF Here |
| 19-Aug-08 | www.drsneaky.com | 4 | 12435234 | $ 500.00 | $ 200.00 | $ 400.00 | $ 400.00 | $ 100.00 | Completed | | | PDF Here |
| 27-Jul-08 | www.drsneaky.com | 4 | 74253452 | $ 324.00 | $ 150.00 | N/A | | N/A | Rejected | | | |
| 18-Jul-08 | www.drsneaky.com | 4 | 32142134 | $ 90.00 | $ 75.00 | N/A | $ 75.00 | $ 15.00 | Completed | | | PDF Here |
| 9-Jun-08 | www.drsneaky.com | 4 | 45412524 | $ 200.00 | $ 175.00 | N/A | $ 175.00 | $ 25.00 | Completed | | | PDF Here |

Total Completed Transactions
Total Original Price         $ 1,155.00
Total Received                  985.00
Total Discount $             $   170.00
Total Discount %                 14.7%

History by Seller

The Buyer can click on "Accept" to bring up the payment screen, which is a pipe directly to the seller's payment gateway or PayPal or Google Checkout A Buyer may Reject the Final Offer by clicking the "Reject", which will ask for confirmation to terminate the transaction.

BUYER DRIVEN MARKET SYSTEM AND METHOD

BACKGROUND

Early growth and expansion of the United States was greatly affected by the availability of goods. Goods could be found at stores and trading posts located in towns or along trails. Goods could be obtained by buying or trading valuables, such as gold, eggs, or livestock for a bit of flour and some cloth, a fur, tools, or any other available necessity.

As communication avenues have broadened due to advancements in technology, modern methods of selling goods can now include virtual stores setting up shop via an online store accessible through an internet connection. Many sellers, or vendors, are exploring effective ways to sell goods via the internet.

Such advances can permit, for example, internet selling where pre-selected buyers can ask for a quote from vendors by generating an request for quote and receiving vendor quotes in response to the request for quote.

One such system is discussed, for example, in U.S. Pat. No. 7,043,457 B1 to Hansen, which discusses a method and system for managing and evaluating commodities purchasing over a network of distributed computing devices. In one embodiment, the method allows a plurality of buyers to generate one request for quote and, response to the request for quote, receive a quote from plurality of vendors. The system provides a price normalization routine that allows buyers to evaluate and compare a normalized price for commodity products having different evaluation parameters. In an arrangement comprising a plurality of computers connected to a network said plurality of computers including at least one server, at least one buyer client computer and a plurality of seller client computers, the method for providing commodities exchange services first provides a web-based browsable display describing at least one commodities exchange service. The system then receives at least one request for quote from the buyer. The system then receives at least one quote from different sellers, wherein each quote may have a different price and quantity listed. The system then compares to one or more selected metrics and normalizes the prices received from the different quotes, thus, allowing the buyer to readily compare the prices of a number of commodity items having inherently different values. In one embodiment, the system also provides a method for multi-value cross compilation of sales transactions, iterative quote information, and metric data for purposes of evaluation and strategy analysis.

Still other systems can provide a system where registered sellers can receive an offer for an item from a registered buyer according to specified rules.

For example, U.S. Pat. No. 5,794,207 to Walker discusses a method and apparatus for effectuating bilateral buyer-driven commerce. Prospective buyers of goods and services communicate a binding purchase offer globally to potential registered sellers, each seller having an assigned ID for maintaining anominity for all transactions, for sellers conveniently to search for relevant buyer purchase offers, and for sellers potentially to bind a buyer to a contract based on the buyer's anonymous purchase offer. In a preferred embodiment, the apparatus includes a controller which receives binding purchase offers from prospective registered buyers. The controller makes purchase offers available globally to potential registered sellers. Potential registered sellers then have the option to accept a purchase offer and thus bind the corresponding registered buyer to a contract.

However, limitations of trustworthiness, closed markets, and goods limitations impair the known systems from achieving a highly effective buyer driven commerce system.

SUMMARY OF THE INVENTION

An electronic negotiation system is set forth. The system includes a first processor adapted to generate and send at least one unsolicited electronic offer from a registered buyer electronic device via a subscriber network device to at least one of a registered seller electronic device and a seller electronic device. The subscriber network device is adapted for operative communication with the first processor and at least one of the registered seller electronic device and the seller electronic device adapted to receive the unsolicited electronic offer.

The subscriber network device includes a data storage device for storing registered user data for each registered seller electronic device. The first processor selectively formulates screenshot information, wherein screenshot information refers to information that is visible on or associated with a seller URL, from a seller URL, in which the unsolicited electronic offer is selectively included and sent to the seller electronic device, or the at least one unsolicited electronic offer is sent to the registered seller electronic device having registered user data stored in the data storage device. Seller data is selectively added to the registered user data stored in the data storage device, and wherein an electronic negotiation is executed directly, using the first processor and the registered seller electronic device via the subscriber network device.

BRIEF DESCRIPTION OF THE DRAWINGS

FIG. 1 illustrates an exemplary embodiment of a system constructed in accordance with the principles herein.

FIG. 2 illustrates another embodiment of a system constructed in accordance with the principles herein.

FIG. 3 illustrates yet another embodiment of a system constructed in accordance with the principles herein.

FIG. 4 illustrates still another embodiment of a system constructed in accordance with the principles herein.

FIG. 7 illustrates a sample screen of an exemplary embodiment constructed in accordance with the principles herein.

FIG. 8 illustrates a list of an exemplary embodiment constructed in accordance with the principles herein.

DETAILED DESCRIPTION

Figure 5A:
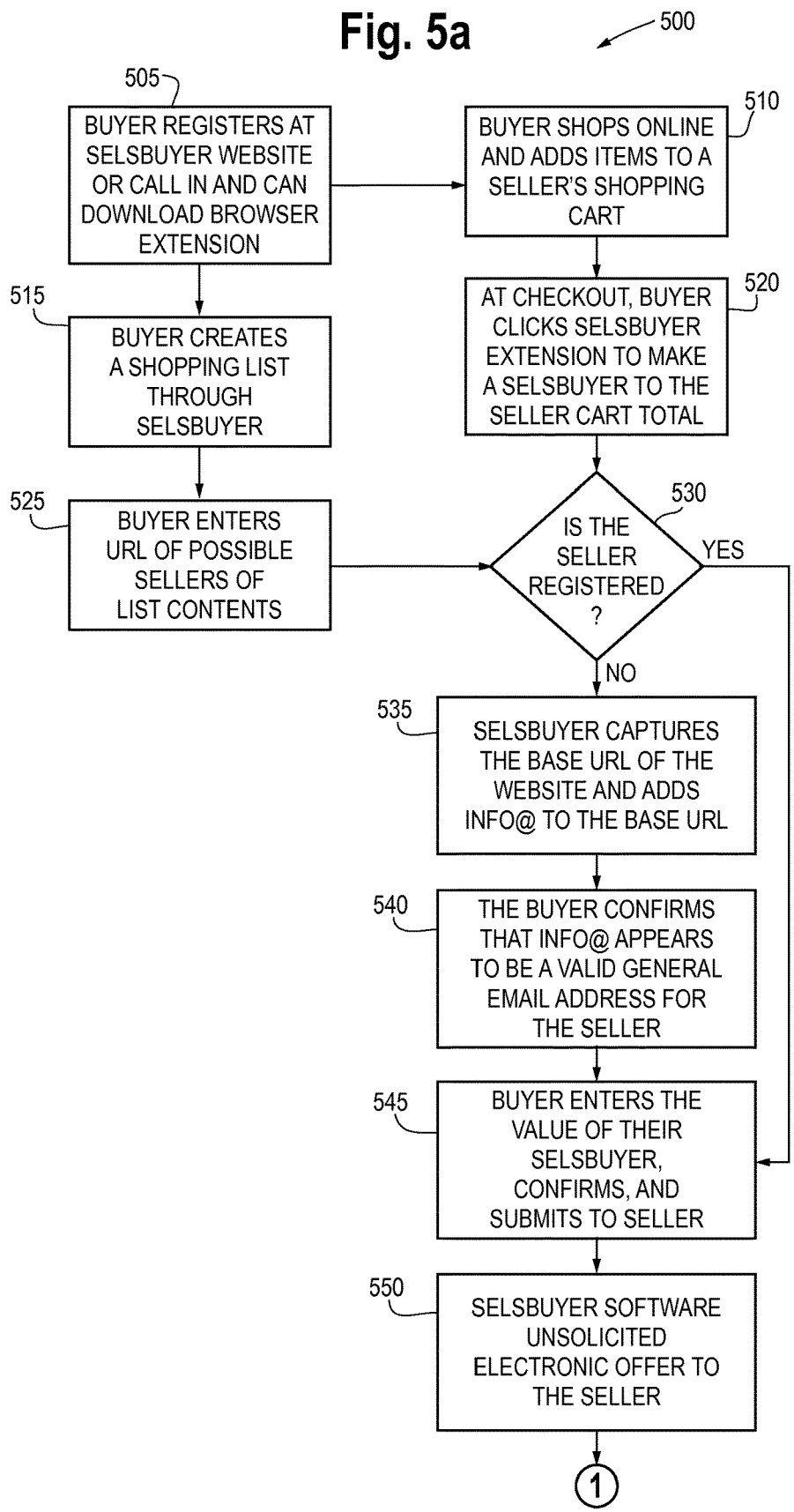
FIG. 5 illustrates an exemplary flow chart describing an embodiment constructed in accordance with the principles herein.

In an embodiment, a system 100 constructed in accordance with the principles of the present invention is shown generally in FIG. 1. The system includes a first processor 120. The first processor 120 can include any suitable processor for generating and sending data electronically, such as a computer, mobile phone, PDA, gaming device, or any other suitable device, adapted to generate at least one unsolicited electronic offer from a registered buyer via, for example, a subscriber network program 140, wherein the subscriber network program is operatively connected to a suitable electronic device, such as a server, or operatively connected to the first processor or other suitable device, to a seller device 160, such as a computer, mobile phone, PDA, gaming device or any other suitable device for receiving the at least one unsolicited electronic offer.

The term "unsolicited electronic offer", as referred to herein, means an offer including items and terms created by the buyer for one or more registered or non registered online sellers for any items or services offered by the registered or nonregistered sellers, wherein the unsolicited electronic offer is sent using the subscriber network program discussed herein, and contains screenshot information, or information from the seller's webpage ranging from, for example, as little as a word, inventory or SKU number, to an image, to as much as an image of a complete webpage of the seller. The unsolicited electronic offer, formulated in accordance with the principles herein, thus opens the available goods to which a registered buyer can make an offer to all goods sold and offered by any online seller. Conceptually, the unsolicited electronic offer turns every online store from performing like a brick and mortar store to, via the unsolicited electronic offer, performing like a booth in a bazaar type online market, where every online store on the planet would now efficiently entertain and decide whether to register if not previously registered in order to respond to offers on their products, other than their listed retail price in their own, same as before, storefront.

The subscriber network program can also be adapted to block selected sellers who attempt to register to respond to an unsolicited electronic offer or to block transmission of an unsolicited electronic offer to selected seller addresses.

In an embodiment, a network subscriber device, such as a network server, is provided for updating and storing data for the network subscriber program. Stored information can then be updated and stored programs operatively connected to the first processor 120 can be selectively updated by connecting to the network server.

In another embodiment, the network subscriber program is stored in a network subscriber server, and all interactions between the first processor 120 and the seller device 160 take place through the network server. In yet another embodiment, encrypted algorithms are generated by at least one electronic device, such as the first processor 120 or the seller device 160, or a network subscriber server, for transmitting data between the first processor 120 and the seller device 160. Contact information for the first processor need not be conveyed within the unsolicited electronic offer. Further, the network subscriber server can be any suitable server, and can accommodate programs other than the network subscriber program herein. Further, a transaction portion of the subscriber program can take place, for example, utilizing "cloud computing" on the buyer or seller local computing device or mobile computing device such as an iPhone.

In accordance with the principles herein, the buyer market is expanded, while computation and processing costs are reduced in comparison to known systems, where all users, buyers and sellers, must pre-register in order to participate in the services of the system. Not only do sellers not have to be pre-registered, but also the system designed in accordance with the principles herein allows for the viral growth of registered sellers, wherein buyers have no need for knowing what sellers are registered and what sellers are not registered, and wherein non-registered sellers are invited to register based on the selection of the seller by registered buyers.

As illustrated in FIG. 2, a system shown generally at 200 can include at least one of a registered seller electronic device 280 and a seller electronic device 260. A subscriber network device 240 is adapted to provide operative communication between a first processor, or buyer electronic device, 220 and the at least one of a registered seller electronic device 280 and a seller electronic device 260. The at least one of a registered seller electronic device 280 and a seller electronic device 260 is adapted to receive the unsolicited electronic offer from the first processor 220.

The system 200 can include an interactive database provided in the Subscriber Network 240 for providing steps for registering a buyer and/or seller electronic device with the Subscriber Network 240. The seller electronic device 260 can be registered, for example, via the Subscriber Network 240 of the interactive database. Once registered, the registered seller electronic device 280 can submit an electronic acceptance or counteroffer to the registered buyer electronic device 220 via the Subscriber Network 240. Where the unsolicited electronic offer is sent, for example, directly from the first processor 220 to the seller electronic device 260, a copy of the unsolicited electronic offer can be generated by the first processor 220 and sent to the subscriber network 240.

As shown in FIG. 3, yet another system shown generally at 300 can be constructed in accordance with the principles herein. The subscriber network device, or Selsbuyer Subscriber Network (SSN), 310 can include, for example, a data storage device, shown generally at 320 for storing registered user data, such as at least one of buyer profile data 330, seller profile data 340, transaction data 350, and guaranteed seller data 360 for each registered buyer electronic device 370, or registered seller electronic device 380. Any other suitable data, such as general terms of sale for a seller, can also be stored in the seller profile data 340.

A seller electronic device 390 can register with the SSN 310 in any suitable manner, such as by inputting data to the seller profile 340, or an indirect manor, such as, for example, by conveying the data via phone, fax or any other available means such that required registration data may be stored in Seller profile 340. The guaranteed seller data storage 360 provides a substantial improvement over known negotiation systems, where a seller is not necessarily subject to the jurisdiction of the courts in the buyer's home country. Providing a way of ensuring a level of trustworthiness of the seller offers a unique built-in buyer protection to deal with less well known sellers.

The guaranteed seller data storage 360 also overcomes jurisdictional problems recently faced in US Federal District Courts with internet companies subject to local jurisdiction, such as E-Bay™. The guaranteed seller data storage 360 can be operatively connected to or provided in the SSN 310. Further, the guaranteed seller data storage 360 can be operated by an independent vendor, such as an insurance company, secretary of state, chamber of commerce, local or national government, or other suitable business or organization.

Any suitable means for determining the trustworthiness of the seller can be employed. For example, the seller can be registered with a local chamber of commerce, insured, or as a client of a guarantor. The guarantor can include, for example, an independent vendor. The guaranteed seller data storage 360 can include seller data, a program for registering sellers, a seller database for a subscribed buyer's reference, or any other suitable data.

The buyer profile data 330 can include a number of parameters, such as number of successful transactions, number of previous transactions with a specific seller, number of offers made on a desired item, or any other useful buyer data parameter. The seller profile data 340 can include a number of parameters, such as successful transactions through the SSN 310, or any other suitable seller data parameter As illustrated in FIG. 4, an embodiment shown generally at 400 can include either a buyer electronic device 410 operatively connected to a downloaded Selsbuyer application program operating within the buyer electronic device 410, or the Selsbuyer application program can be operated on a server or computer operatively connected to the buyer electronic device 410, as illustrated and discussed in detail below with respect to FIG. 5. The Selsbuyer application program can include an item database 420 stored in communication with the Selsbuyer application program, for storing shopping items or other data that is useful to a buyer in operating the Selsbuyer application program. Alternatively, item database 420 could be item data generated by a shopping search engine, such as NexTag, where items and seller information could be imported to the Selsbuyer application.

Additionally, the seller can operatively connect a seller item database 460 to the Selsbuyer application program for storing information such as invoice cost and inventory on hand, for items for sale, on which an offer may be received. This will be particularly helpful for the seller to process a completed transaction and fulfill the order.

In this embodiment, a signal incorporating an unsolicited electronic offer 440 can be transmitted directly from the buyer electronic device 410 to a seller electronic device 430, and the items for which the offer is being made can be selected from the item database 420. Alternatively, the buyer can shop offline using the item database 420, and submit an unsolicited electronic offer via SSN 450.

A method shown generally at 500 in FIG. 5 can be provided. In a first step 505, a buyer can register with a subscriber network, such as a Selsbuyer Subscriber Network (SSN), such as, for example, by navigating to www.selsbuyer.com and following the steps to register.

Alternatively, a registered buyer can sign, or log in, by navigating to, for example, www.selsbuyer.com, or by calling a phone number and entering a password. The buyer can then either shop online, as illustrated in step 510, or create a shopping list through the SSN, shown at step 515. A buyer shopping online can then add one or more items to a shopping cart, or similarly functioning online shopping program, of a website, and select SSN extension to create an unsolicited electronic offer, or Selsbuyer, to the completed shopping cart at step 520, as described in further detail below.

In an embodiment, the seller can opt to have their online shopping program integrated with the Selsbuyer network, which would not require a browser extension, such as a PDF of the sellers online shopping program with selected items shown, to create the unsolicited electronic offer, and the unsolicited electronic offer can be submitted directly via a submit button or other similar button on the integrated online shopping program webpage.

Alternatively, the buyer can create a shopping list through, for example, a shopping list tab provided within or operatively connected to the SSN at step 515. The buyer can then enter an online address, or URL, of one or more sellers whom the buyer wants to transmit the list of items and offered price, as shown at step 525.

Once the buyer has completed step 520 or step 525, the SSN determines if, based on the seller URL, or other unique identifier of the seller, the seller is registered with the SSN, as shown at step 530. If the SSN determines that the seller is not registered, the SSN captures the base URL of the seller's website, and can add, for example, info@ to the base URL, or sales@ to the base of the URL, or any other suitable identifier for contacting the seller, as shown at step 535. The buyer can then confirm in step 540 that, for example, info@sellerURL.xyz, where x, y, and z are variables, appears to be a valid general email address for the seller at step 540. Next, the buyer enters the value of their unsolicited electronic offer, or Selsbuyer, confirms, and submits to the SSN at step 545. The SSN then transmits the Selsbuyer to the seller at step 550. Once the seller receives the Selsbuyer, shown at step 555, he can choose to register with Selsbuyer, as shown at step 560 if he is not already registered. When he contacts the SSN, the SSN determines if the seller is registered or not, as shown at step 565. The seller can also end the process by not registering with the SSN, as shown at step 570.

If the seller is registered or registers, information can then be entered regarding the seller response to the Selsbuyer, as shown at step 575. For example, the seller can accept the complete offer or a portion of the complete offer, accept payment, process and fulfill the offer, as shown at step 580.

The SSN can then process a charge to, for example, the seller, the buyer, or an advertiser, or any other suitable party for facilitating the completed transaction, as shown at step 585.

The seller can take a number of alternative steps, such as making a counter offer 591, making a counter offer with alternative items 592, rejecting the offer 593, which terminates the offer, or ignoring the offer 594, in which case the offer will expire after a predetermined time period. Any time period can be chosen as the expiration time for an offer, and if so desired can be incorporated into the Selsbuyer program as a set default or a selectable parameter. If the seller chooses to make a counter offer, he must first register if he is not already registered. The seller can then make a counter offer or a counter offer with alternate items, then an email is generated at step 595 containing the seller's final offer and is sent to the buyer. The buyer then chooses at step 596 to accept or reject the seller's counter offer 595. If an offer, made by the buyer or the seller, is ever rejected or terminates, notice will be sent to the offeror 597. If the seller accepts the buyers offer or if the buyer accepts the seller's counter offer 595, then the seller is paid at step 580, such as, for example, by a secured website, or any other suitable payment method, and a fee is charged for the completed transaction at 585. Otherwise, the counter offer terminates.

Figure 6A:
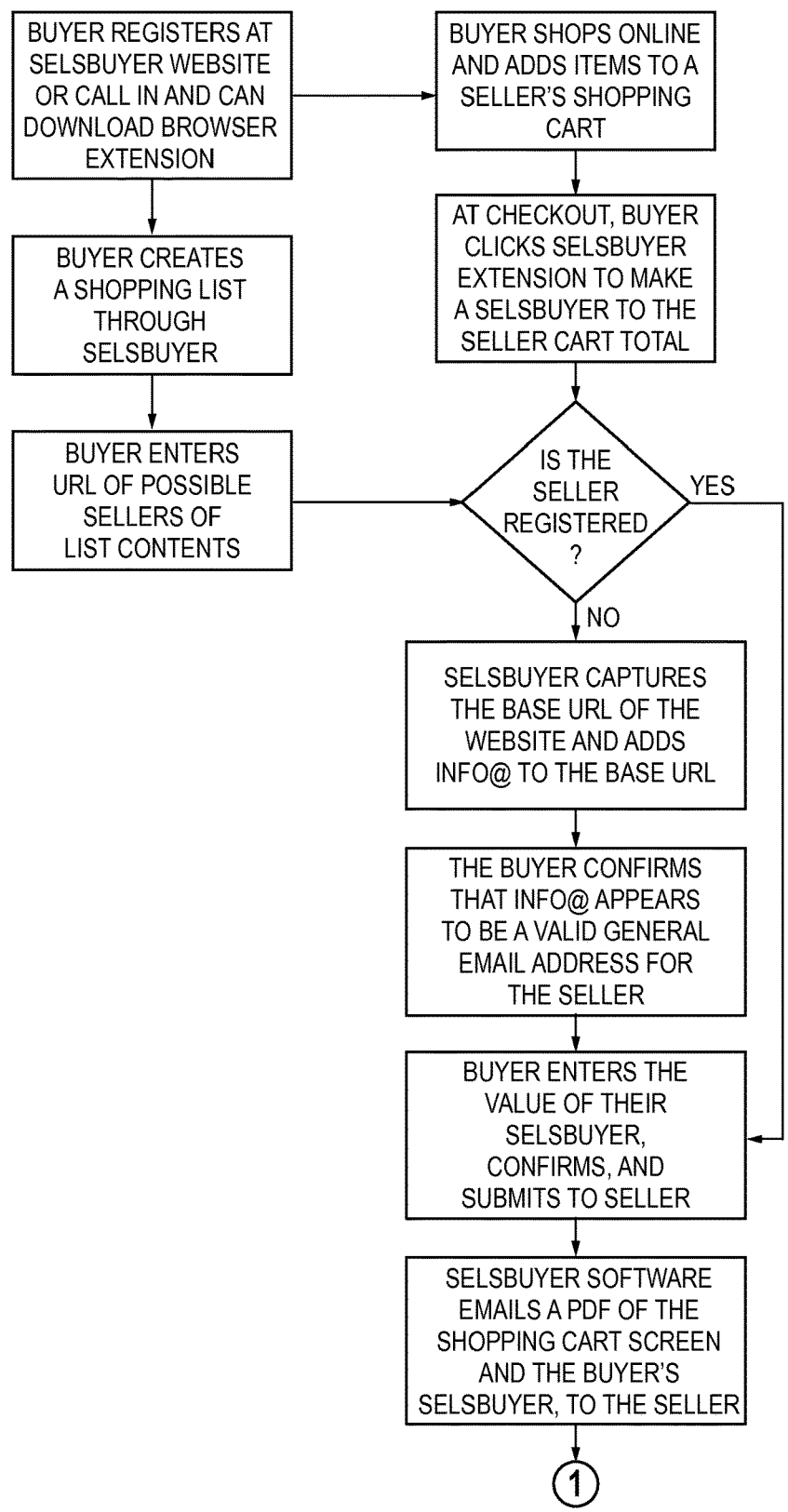
FIG. 6 illustrates another an exemplary flow chart describing an embodiment constructed in accordance with the principles herein.
Figure 6B:
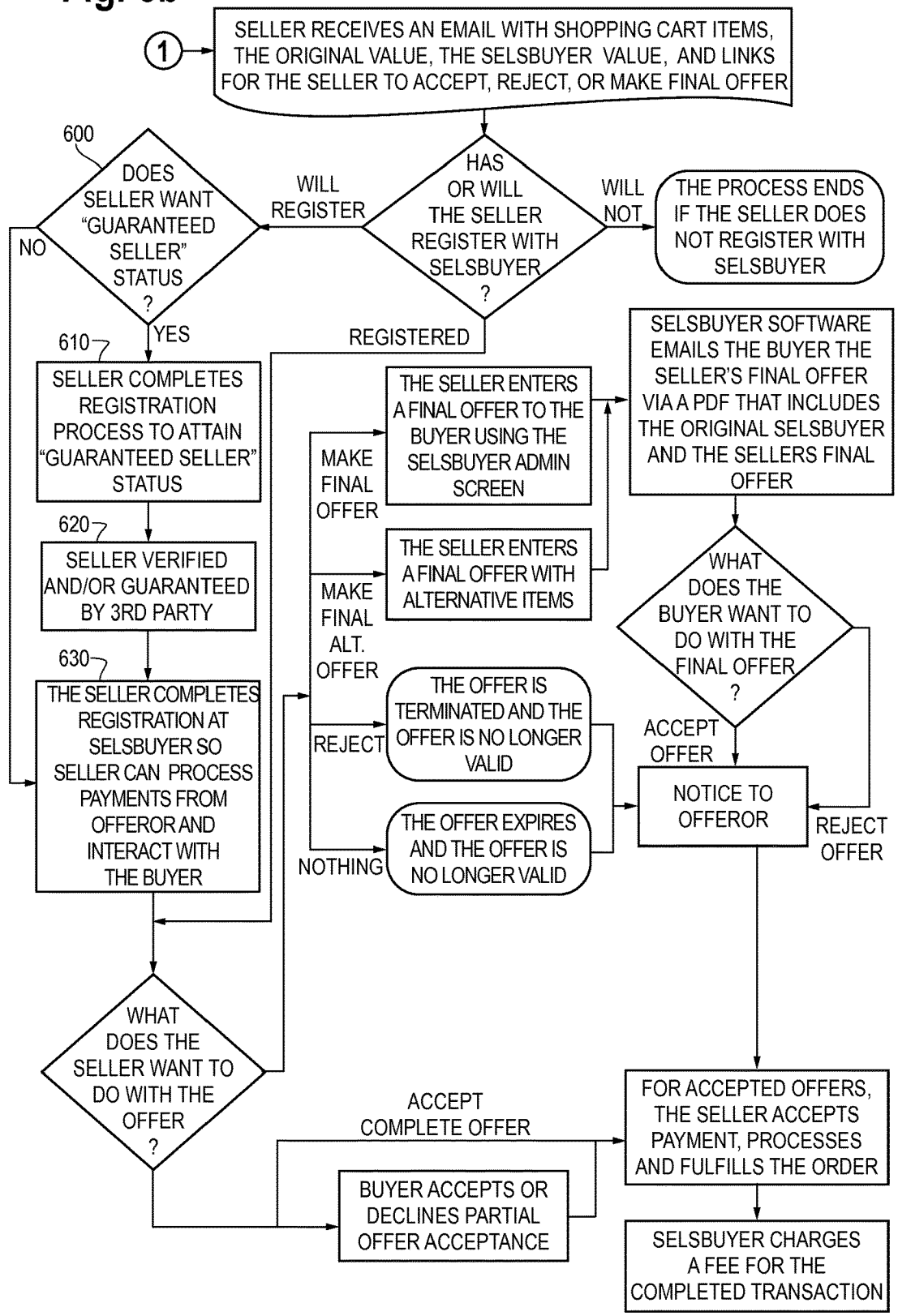

In another embodiment illustrated in FIG. 6, a third party, such as an insurance company, governmental body, better business bureau, or any other suitable third party, including an operator for a Selsbuyer network, can guarantee the seller at step 620 if the seller has selected guaranteed seller designation at step 600 in the registration process and then registers at 610 as a guaranteed seller. This embodiment allows buyers to use Selsbuyer to purchase goods from less known or unknown sellers with an option to discriminate about the willingness of that type of seller to submit to local jurisdiction or to offer some reasonable recourse for a buyer in the event of a breach of terms or misrepresentation of the product of the seller. Whether the seller chooses to register as a guaranteed seller or not, the seller completes the registration process at step 610.

In yet another embodiment illustrated in FIG. 7, the Selsbuyer program can include a seller admin screen, shown generally at 700. This screen allows the seller to accept a transaction at 710, reject a transaction at 720, or make a final offer at 730. Further, the seller can have a link to report information 740, such as buyer history, time period history, counter offer matrix, final offer matrix, and/or report annoying user, provided on the seller admin screen to assist his decision regarding the transaction. Similarly, a buyer admin screen can be provided, and can include features such as the exemplary features shown on the seller admin screen 700, or any other suitable features to help facilitate the transaction.

In still another embodiment illustrated in FIG. 8, a list including one or more items, shown generally at 800, can be created in accordance with the principles herein in either an online or an offline setting.

The list can include desired items selected from, for example, shopping items, services, hotels, rental car, flight, and the like. To facilitate an organized shopping experience, tabs, such as tabs 810-850 can be provided to keep the subject matter of the list sorted by selected general classes. The tabs 810-850 shown in FIG. 8 are exemplary, and could be targeted to a specific market. For example, the program could be tailored for an auto parts purchaser, and the tabs could indicate various car manufacturers.

A buyer can type in or import seller URL's to submit an offer for one or more items indicated on the list. A buyer using an offline Selsbuyer program can then connect the program to a communication link, such as the internet, to transmit the shopping list Selsbuyer, or can connect to a communication link, such as the internet, to transmit the shopping list to a Selsbuyer network server device, or SSN.

In an embodiment, if a buyer makes an offer to several sellers, the transaction of at least one item will be completed when the buyer or first accepting seller accepts the offer on the one or more items.

Figure 9:
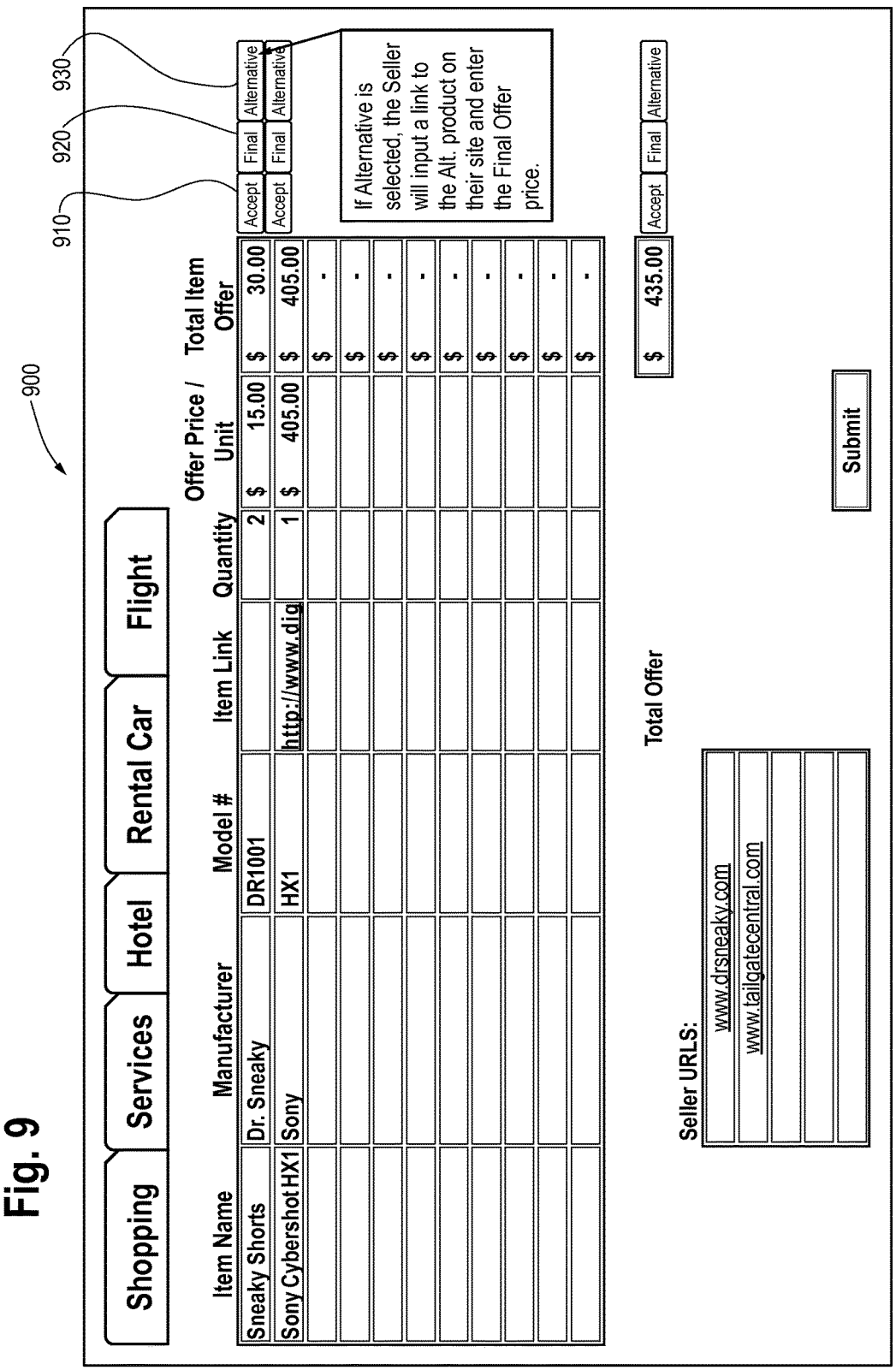
FIG. 9 illustrates another embodiment of a list having incorporated response keys constructed in accordance with the principles of the present invention.

As illustrated in another embodiment shown generally at 900 in FIG. 9, the Selsbuyer program can generate response keys and embed them on a completed shopping list, such as the list illustrated in FIG. 8, before transmitting to a seller. Examples of suitable embedded response keys can include, but are not limited to, for example, an accept key 910, a final offer key 920, an alternative key, for offering alternate products, 930, or any other suitable key, such as a partial acceptance key, or any other suitable key. As an alternative, these keys and similar response station as represented in FIG. 9 may be accessed by the seller by logging into the seller admin screen and selecting at least one offer.

Figure 10:
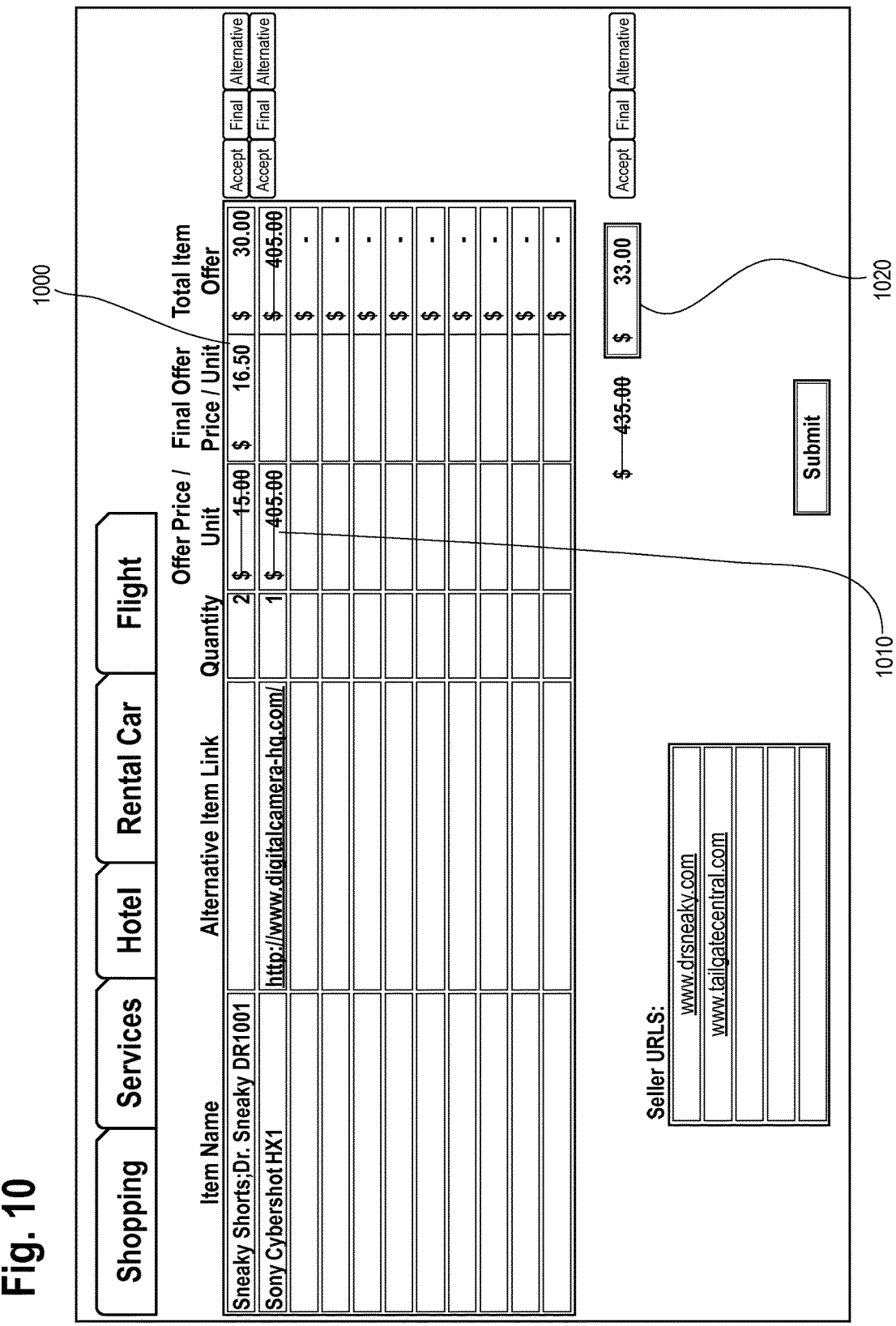
FIG. 10 illustrates yet another embodiment of a list having final offer price entries constructed in accordance with the principles herein.
Figure 11A:
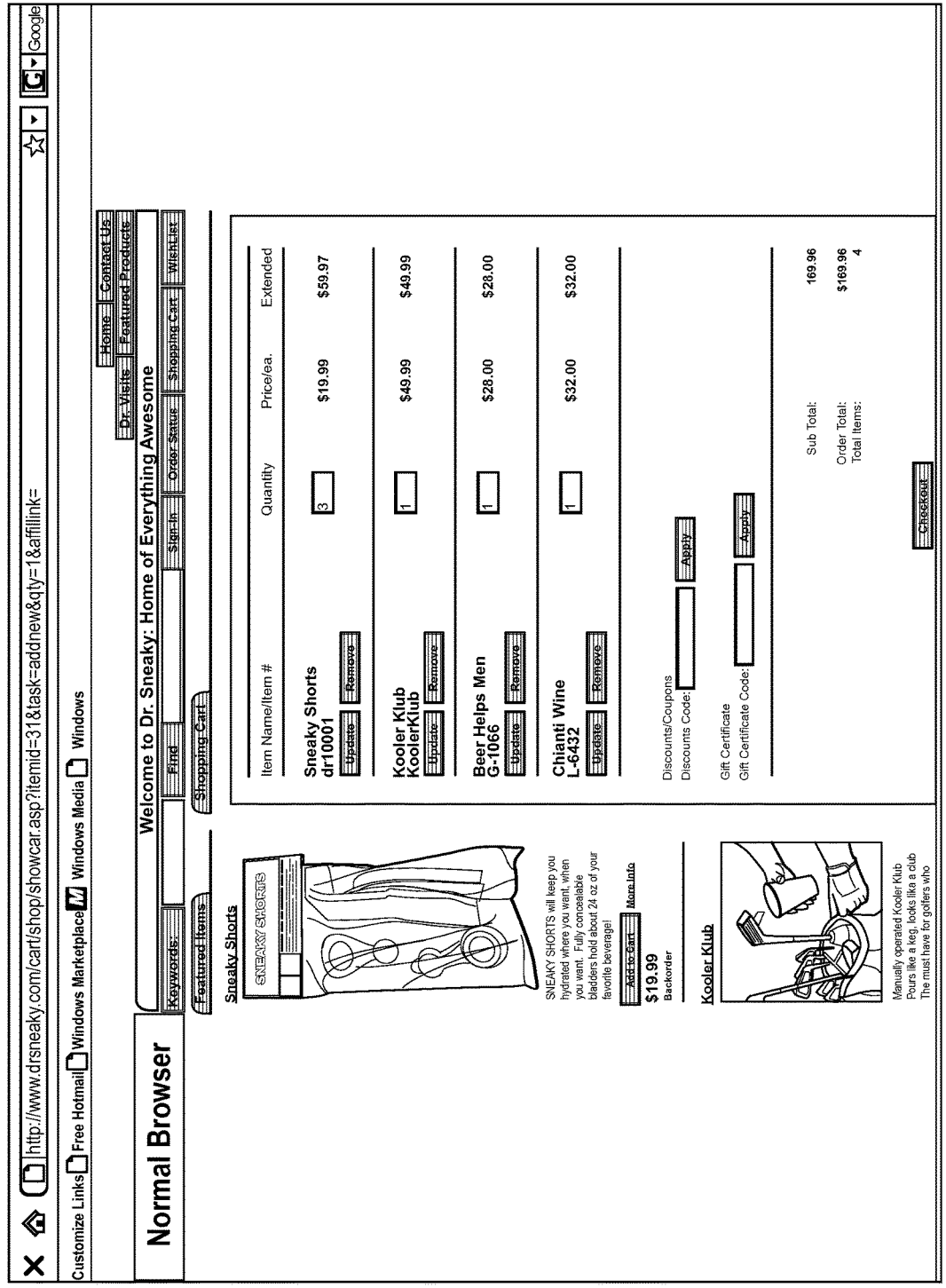
FIGS. 11(*a*)-(*s*) illustrates exemplary steps (a)-(w) of one embodiment of a system constructed in accordance with the principles herein, wherein an unsolicited electronic offer includes incorporated information from a sellers webpage.
Figure 11B:
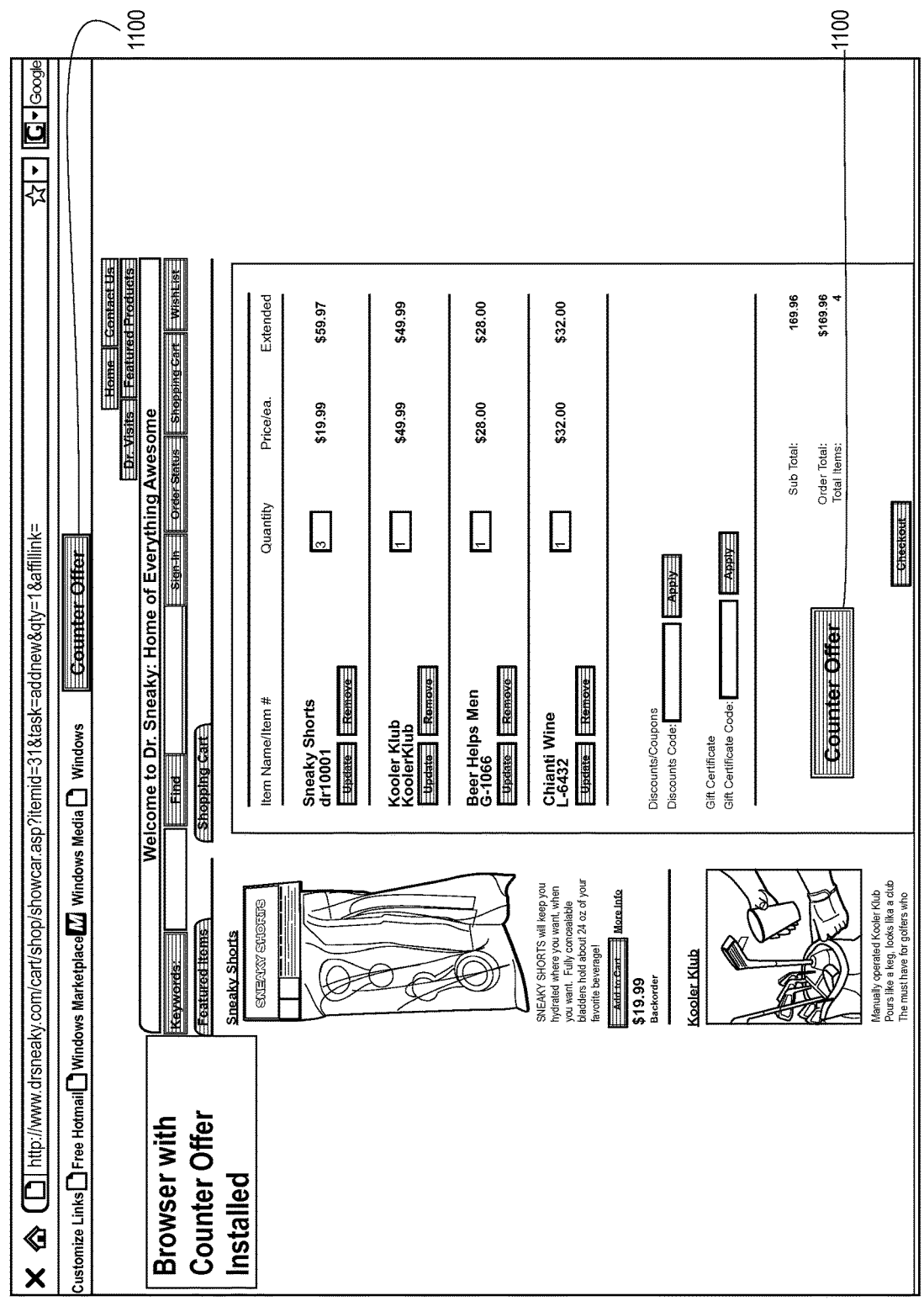
Figure 11E:
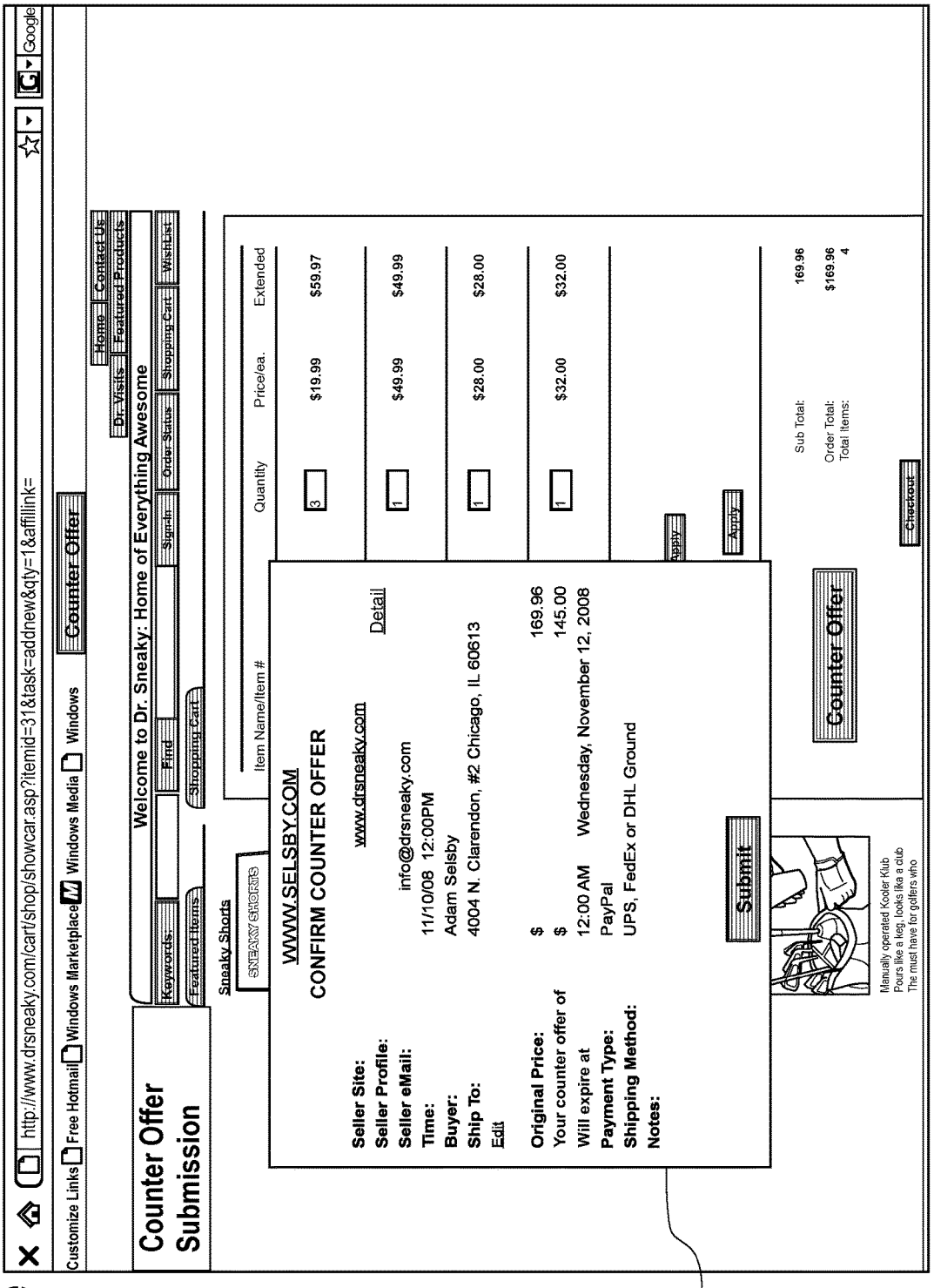
Figure 11F:
Figure 11H:
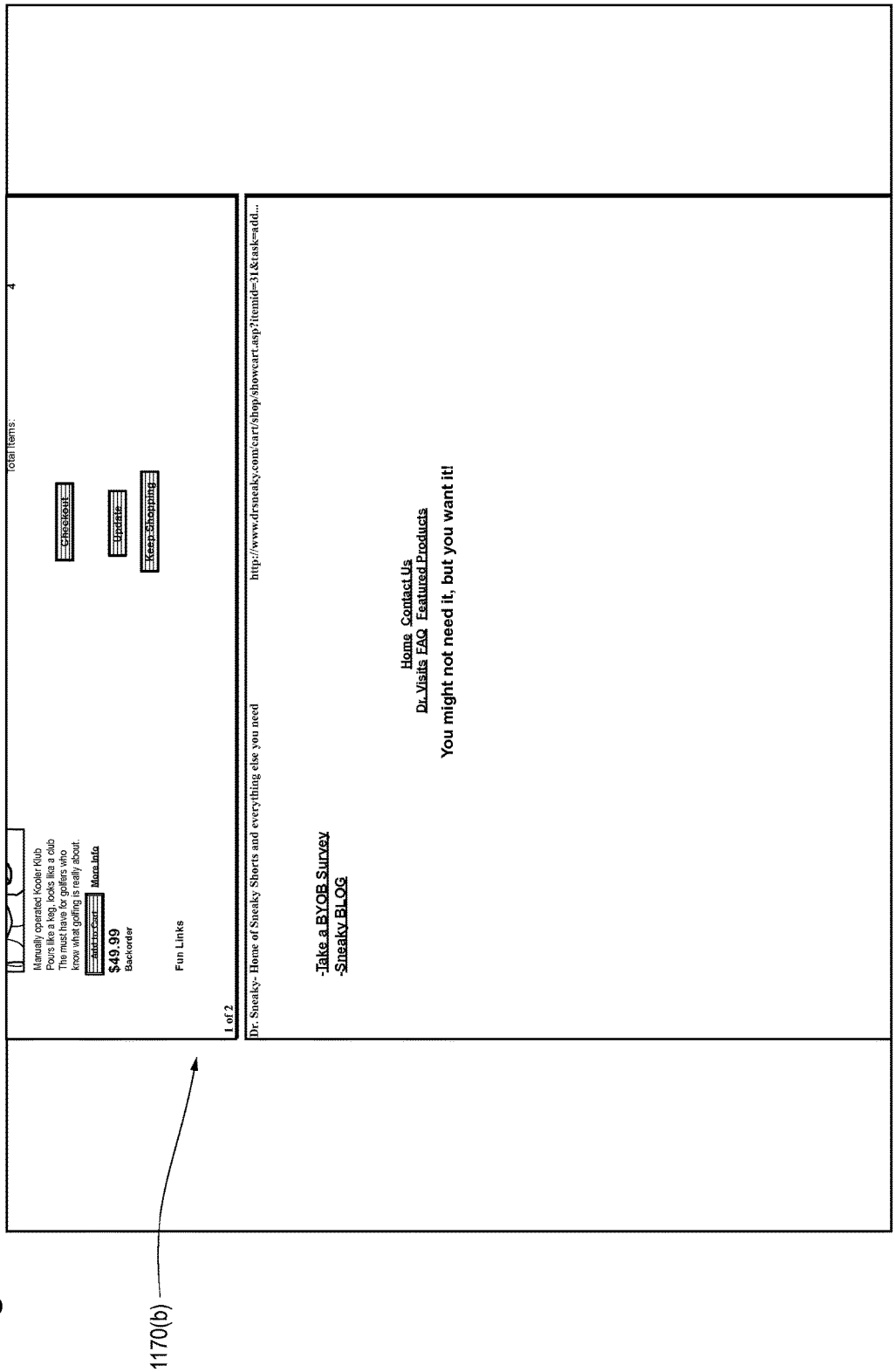
Figure 11J:
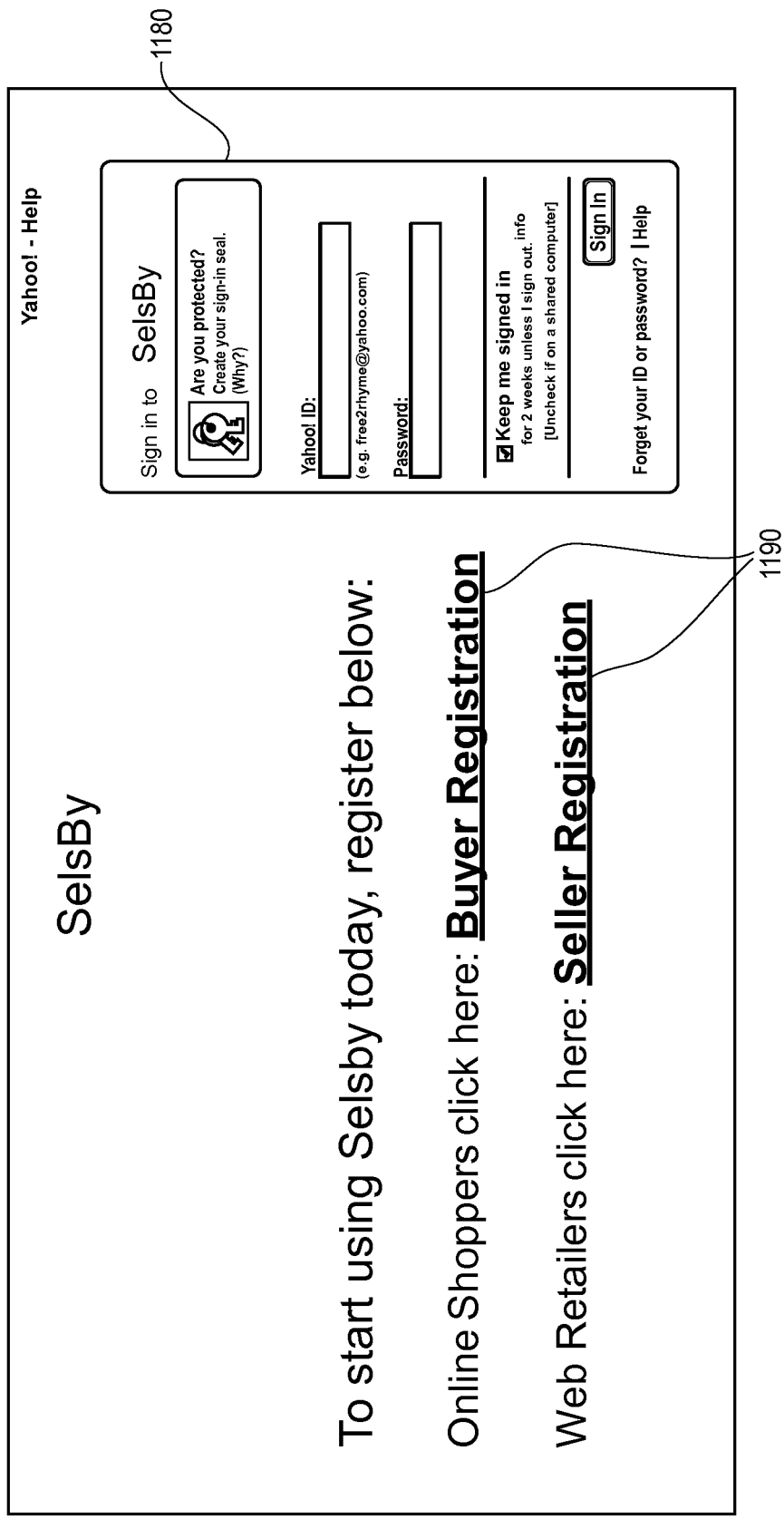

FIG. 10 further illustrates how a completed seller counter offer might appear, where the seller has both made a counter offer to the buyer and altered the shopping list based on inventory or any other reason. Here, the seller has entered counter offer Data 1000 for the price of, for example, a pair of Sneaky Shorts™ and has crossed out the digital camera data from 1010, which adjusts the price at total data 1020.

As illustrated in FIG. 11(*a*), a buyer can visit a seller's website without registering or installing a system constructed in accordance with the principles herein. If the buyer chooses to install a system constructed in accordance with the principles herein, then, for example, in one embodiment of a system constructed in accordance with the principles herein, the browser at the website shown in FIG. 11(*a*) will include a Counter Offer button 1100, as illustrated in FIG. 11(*b*), or any other suitable toolbar item or user interface to initiate the counter offer, such as, for example, a box, icon, dialogue box, or any other suitable visual button or pull down menu selection. Further, a button 1110 can be provided, or any other suitable box, button, user interface or pull down menu, for generating an unsolicited electronic offer, such as, for example, the unsolicited electronic offer 1120 via the system herein. As illustrated in FIG. 11(*c*), the unsolicited electronic offer 1120, can be sent to an unregistered seller by capturing, for example, the base URL of the site, and generating a message to at least one of general commonly used email addresses, for example, sales@the base URL or info@the base URL, as illustrated at 1130. Other methods of capturing seller contact information from the seller's website, by the buyer, or other trusted site for storing the information, can be utilized to generate the message. In this manner, an unregistered seller can receive a counter offer 1130 from a registered buyer. Similarly, a registered seller counter offer can be generated for a registered seller, such as offer 1140 including, for example, price, payment type, and shipping method, or any other suitable offer parameters, as shown in FIG. 11(*d*).

A screen can then be presented offering editing options to confirm the information displayed in the counter offer 1140, as illustrated in FIG. 11(*e*). The screen can include, for example, a suitable display box 1150, or icon, voice activated, text input confirmation, or any other suitable confirmation to confirm the counter offer submission. As illustrated in FIG. 11(*f*), an email, text message, or other suitable message, such as, for example, email 1160 can then be generated to transmit the unsolicited electronic offer 1140, and can set forth information, such as, for example, a transaction ID, counter offer price, and links to respond to the unsolicited electronic offer 1140. The unsolicited electronic offer 1140 can include information, referred to herein as screenshot information, from the seller's website, such as, for example, an inventory number, item name, item graphic or picture, or even an entire screenshot of the seller's webpage as illustrated, for example, with a screenshot 1170(*a*) and (*b*), shown in FIGS. 11(*g*) and 11(*h*), incorporated in, for example, the unsolicited electronic offer 1140, as shown in FIG. 11(*i*) at 1170(*c*).

As illustrated in FIG. 11(*j*), the network subscriber program, or Selsby, can include, for example, any suitable login screen 1180 and suitable registration links 1190. Once a registered seller is logged in, or if an unregistered seller, in one embodiment, a seller can register, by filling in a suitable form, such as form 1192 in FIG. 11(*k*). Once registered, a suitable administration screen can be provided for a registered seller, such as, for example, a seller admin screen 1194 illustrated in FIG. 11(*l*). In an embodiment, a seller can then counter with a final offer 1196, as shown in FIG. 11(*m*), and confirm and submit the final offer using, for example, a submit final offer button 1198 as illustrated in FIG. 11(*n*). The final offer 1196 can then be generated and sent to the buyer as illustrated, for example, in FIGS. 11(*o*), (*p*), and (*q*). A buyer can register, for example, as illustrated in FIG. 11(*r*) prior to initiating a shopping and offer session. In an embodiment, the buyer can also be provided with a buyer admin screen 1199 as illustrated, for example, in FIG. 11(*s*).

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for a system to facilitate communication with unregistered sellers comprising the steps of:
   utilizing a system program to generate, using a browser extension, and send at least one unsolicited electronic offer via a first processor adapted to generate and send the unsolicited electronic offer from a registered buyer electronic device through the system to an unregistered seller electronic device; and
   facilitating direct negotiating terms of the at least one unsolicited electronic offer via the system;
   wherein the step of utilizing the system program includes incorporating information from a seller URL through the browser extension of the system into the at least one unsolicited electronic offer.

2. The method of claim 1, wherein the step of utilizing the system program further comprises the step of selectively incorporating screenshot information from an unregistered seller URL via the system program.

3. The method of claim 1, further comprising the step of:
   including a data storage device for storing registered user data for each unregistered electronic seller device that selects to register via the system program.

4. The method of claim 1, wherein the step of utilizing the program is further defined by utilizing a system program downloaded to the first processor, the system program comprising the browser extension.

* * * * *